(12) United States Patent
Scharmüller et al.

(10) Patent No.: US 9,764,778 B2
(45) Date of Patent: Sep. 19, 2017

(54) COUPLING PART

(71) Applicants: Josef Scharmüller, Fornach (AT);
Josef Scharmüller, Jr., Fornach (AT)

(72) Inventors: Josef Scharmüller, Fornach (AT);
Josef Scharmüller, Jr., Fornach (AT)

(*) Notice: Subject to any disclaimer, the term of this patent is extended or adjusted under 35 U.S.C. 154(b) by 0 days.

(21) Appl. No.: 14/779,871

(22) PCT Filed: Mar. 25, 2014

(86) PCT No.: PCT/AT2014/000051
§ 371 (c)(1),
(2) Date: Sep. 24, 2015

(87) PCT Pub. No.: WO2014/153577
PCT Pub. Date: Oct. 2, 2014

(65) Prior Publication Data
US 2016/0052563 A1    Feb. 25, 2016

(30) Foreign Application Priority Data
Mar. 25, 2013  (AT) .................. A 228/2013

(51) Int. Cl.
*B62D 27/06* (2006.01)
*A01B 59/06* (2006.01)
*A01B 71/06* (2006.01)

(52) U.S. Cl.
CPC .......... *B62D 27/06* (2013.01); *A01B 59/06* (2013.01); *A01B 71/063* (2013.01)

(58) Field of Classification Search
CPC ....... A01B 59/02; A01B 59/06; A01B 59/063; B61D 1/363; B62D 27/06
See application file for complete search history.

(56) References Cited

U.S. PATENT DOCUMENTS

| | | | |
|---|---|---|---|
| 4,355,945 A * | 10/1982 | Pilch ............... | E02F 3/3663 172/274 |
| 4,509,768 A | 4/1985 | Haug | |
| 6,994,511 B2 * | 2/2006 | Westendorf ........ | E02F 3/3645 414/686 |
| 7,618,052 B2 | 11/2009 | Scharmüller | |
| 8,596,665 B2 | 12/2013 | Scharmüller et al. | |
| 8,690,179 B2 | 4/2014 | Scharmüller et al. | |
| 2011/0196575 A1 | 8/2011 | Scharmüller et al. | |

(Continued)

FOREIGN PATENT DOCUMENTS

| | | |
|---|---|---|
| CH | 701 819 | 3/2011 |
| DE | 29 00 866 | 7/1980 |
| DE | 30 09 284 | 9/1981 |

(Continued)

OTHER PUBLICATIONS

International Search Report issued by the European Patent Office in International Application PCT/AT2014/000051.

*Primary Examiner* — Bryan Evans
(74) *Attorney, Agent, or Firm* — Henry M. Feiereisen LLC (57) ABSTRACT

A coupling part of a vehicle coupling system has a positioning device for guiding a counter-coupling part into a fixing position during a coupling operation, and a fixing device is arranged moveably between a release position and a fixing setting, wherein, in the fixing setting, the fixing device can fix a counter-coupling part in the fixing position in a positionally secure manner.

12 Claims, 6 Drawing Sheets

(56) References Cited

U.S. PATENT DOCUMENTS

2011/0209608 A1* 9/2011 Stefek .................. E02F 3/3618
91/420

FOREIGN PATENT DOCUMENTS

| | | |
|---|---|---|
| DE | 82 15 040 | 8/1982 |
| DE | 41 32 889 | 4/1992 |
| DE | 20 2005 005 676 | 9/2005 |
| DE | 10 2009 056 071 | 6/2011 |
| FR | 2 687 115 | 8/1993 |

* cited by examiner

COUPLING PART

CROSS-REFERENCES TO RELATED APPLICATIONS

This application is the U.S. National Stage of International Application No. PCT/AT2014/000051, filed Mar. 25, 2014, which designated the United States and has been published as International Publication No. WO 2014/153577 and which claims the priority of Austrian Patent Application, Serial No. A 228/2013, filed Mar. 25, 2013 pursuant to 35 U.S.C. 119(a)-(d).

BACKGROUND OF THE INVENTION

The invention relates to a coupling part of a vehicle coupling system according to the preamble of claim 1.

A large number of trailers and insertable tools are known in the communal, agricultural or silvicultural area, which perform different tasks such as a snowplough, a rotary snowplough, a sweeping apparatus, a reaping machine and the like. A number of different vehicles with different hitching and coupling systems are provided in operation for different trailers and inserts, which systems comprise a coupling apparatus for the different trailers and inserts, e.g. a drawbar or three-point hydraulic power lift. In this respect, the different trailers and inserts often place very different requirements on the hitching and coupling systems since specific trailers need to be hitched in an articulated manner and others need to be fastened in a fixed manner to the vehicle such as a snowplough.

It is disadvantageous in subsystems that a frequent change of the trailer or the attached device is usually necessary in operation, thus requiring a relatively large fleet of vehicles. Furthermore, the change of a trailer usually often requires two persons, or it is only possible by an experienced person in a time-consuming manner and with a lot of input of force because the change of a trailer requires handling the hitching or coupling system, e.g. for connecting the PTO shaft or electrical connections. Such a change represents a considerable potential hazard because a person needs to work in the hazard zone between the tractor vehicle and trailer for the changing process.

SUMMARY OF THE INVENTION

It is therefore the object of the invention to provide a coupling part of a vehicle coupling system with which the aforementioned disadvantages can be avoided and with which a rapid and secure coupling process is possible.

This is achieved in accordance with a coupling part of a vehicle coupling system, comprising: a positioning device comprising a centering receiver and a catching apparatus, said centering receiver narrowing in a direction of a first end of the centering receiver and being constructed for receiving an insert body of a counter-coupling part, thereby centering the counter-coupling body, the catching apparatus having at least one catching arm, the catching arm being movably mounted so that during a draw-in movement the catching arm is first moved in a direction of the centering receiver and is subsequently moved in a direction of the first end of the centering receiver, the catching arm during the draw-in movement engaging the counter coupling part received in the centering receiver in a catching region and transferring the counter coupling part into a fixing position; and a fixing device movable between a release location and a fixing location, said fixing device, fixing the counter-coupling part to the coupling part in the fixing position in a positionally secure manner.

This leads to the advantage that the hitching of a trailer or an attachment device to a vehicle can be facilitated to a substantial extent. The change can occur in a substantially fully automatic manner because the coupling part suitably aligns the counter-coupling part by means of the positioning device and fixes the same in a positionally secure manner by the fixing device. As a result, the operator of the vehicle can remain in the driver's cab during the coupling process, thus reducing the time required for the process and virtually eliminating the hazard potential. Furthermore, the counter-coupling part can be attached directly to the trailer or the tool, or it can be an adapter with a conventional coupling system so that conventional trailers and tools can be used.

The invention further relates to a vehicle coupling system according to the preamble of the corresponding independent claim.

The invention further relates to a vehicle according to the corresponding independent claim.

The invention further relates to an attachment module according to the preamble of the corresponding independent claim.

The invention further relates to a method for coupling a vehicle coupling system according to the corresponding independent claim.

It is therefore the further object of the invention to provide a method for coupling a vehicle coupling system with which the aforementioned disadvantages can be avoided and with which a rapid and secure coupling process is enabled.

According to another aspect of the invention, this object is achieved in accordance with the invention by a method for coupling a vehicle coupling system, wherein a counter-coupling part is guided in a positioning step to a fixing position of a coupling part, wherein the counter-coupling part is fixed in a fixing step by a fixing device of the coupling part in a positionally secure manner to the coupling part.

The advantages of the method correspond to the aforementioned advantages of the coupling part.

The dependent claims relate to further advantageous embodiments of the invention.

Express reference is hereby made to the wording of the claims, as a result of which the claims are inserted at this point into the description by way of reference and shall apply as being literally reproduced.

BRIEF DESCRIPTION OF THE DRAWING

The invention will be explained below in closer detail by reference to the enclosed drawings which merely show preferred embodiments by way of example, wherein.

DETAILED DESCRIPTION OF PREFERRED EMBODIMENTS

FIGS. 1 to 7 and 12 to 15 show at least parts of preferred embodiments of a coupling part 1 of a vehicle coupling system 2. A vehicle coupling system 2 is a system for the releasable coupling of an attachment module 8 to a vehicle 7. The vehicle coupling system 2 comprises a coupling part 1 and a counter-coupling part 4 which can be connected to the coupling part 1. In this case, the coupling part 1 can be fastened to the vehicle 7 or the attachment module 8 for example.

It is provided that the coupling part 1 comprises a positioning device 3 for guiding a counter-coupling part 4 to a fixing position during a coupling process, a fixing device 5 is movably arranged between a release position and a fixing position, wherein the fixing device 5, in the fixing position, can fix a counter-coupling part 4 in a positionally secure manner in the fixing position. A coupling process can thus occur in an especially rapid and secure manner.

The positioning device 3 is a device of the coupling part 1, which is formed to transfer, during a coupling process, the counter-coupling part 4 to be coupled from a predeterminable region to a predeterminable fixing position, wherein the counter-coupling part 4 arranged in the fixing position can be fixed in a positionally secure manner by the fixing device 5 to the coupling part 1.

The fixing device 5 is formed in this case to come into engagement with a portion of the counter-coupling part 4 which is especially at least partly diametrically opposed, and to connect the counter-coupling part 4 by means of interlocking connection in a positionally secure manner, i.e. especially in the rigid manner, to the coupling part 1. The fixing occurs in this case by means of a counter-coupling part 4 arranged in the fixing position, wherein the fixing position can also be recognised as the fastening position of the counter-coupling part 4.

Furthermore, a vehicle coupling system 2 can be provided which comprises a coupling part 1 and a counter-coupling part 4, wherein the counter coupling part 4 can be fixed in the fixing position by the fixing device 5 in a positionally secure manner to the coupling part 1.

It is provided in a method for coupling a vehicle coupling system 2 that in one positioning step the counter-coupling part 4 is guided to a fixing position of a coupling part 1, wherein the counter-coupling part 4 is fixed in a fixing step by a fixing device 5 of the coupling part 1 in a positionally secure manner to the coupling part 1. A coupling process can thus occur in an especially rapid and secure manner.

Furthermore, a vehicle 7 having at least one coupling part 1 can be provided.

It can preferably be provided that the coupling part 1 comprises a contact device 6 with connections 61 which are arranged in a movable manner, especially a linearly movable manner, wherein the contacting device 6, in the fixing position of the fixing device 5, can move the connections 61 in the direction of a counter-coupling part 4 situated in the fixing position. The contacting device 6 is formed to operatively connect the connections 61 to the counter-coupling part 4, especially automatically, in the case of a counter-coupling part 4 which is retained in the fixing position. The operative connection of the connections 61 with the counter-coupling part 4 means in this context that the connections 61 are connected to counter-connections 43 of the counter-coupling part 4. A reliable, and especially automatic, connection of the connections 61 with the counter-coupling part 4 can thus occur, because the counter-coupling part 4 is retained in a positionally secure manner in a predeterminable position, i.e. the fixing position. The connection can occur by a movement of the connections 61 by the contacting device 6 in the direction of the counter-coupling part 4.

It can further be provided that the counter-coupling part 4 comprises counter-connections 43, and the contacting device 6 can operatively connect the connections 61 of the coupling part 1 and the counter-connections 43 of a counter-coupling part 4 situated in the fixing position.

It can be provided in the method that subsequently connections 61 of the coupling part 1 and counter-connections 43 of the counter-coupling part 4 are operatively connected in a contacting step by a contacting device 6.

It can alternatively be provided that the coupling part 1 comprises fixed connections 61. In this case, the fixed connections 61 are operatively connected in the positioning step to the counter-coupling part 4, especially automatically. The operative connection of the connections 61 with the counter-coupling part 4 means in this connection that the connections 61 are connected to the counter-connections 43 of the counter-coupling part 4. This can occur in an especially preferred manner when a centering of the counter-coupling part 4 occurs during the positioning step, which thus allows a well-guided movement of the connections 61 to the counter-connection 43 to occur. The fixed connections 61 can be formed like the movably arranged connections 61 of the contacting device 6.

An attachment module 8 for a vehicle 7 can be provided in an especially preferred manner, wherein the attachment module 8 comprises a counter-coupling part 4 with counter-connections 43, the counter-coupling part 4 can be fixed in a positionally secure manner to the coupling part one of the vehicle 7, and the counter-connections 43 can be connected to the connections 61 of the coupling part 1.

Figure 1:
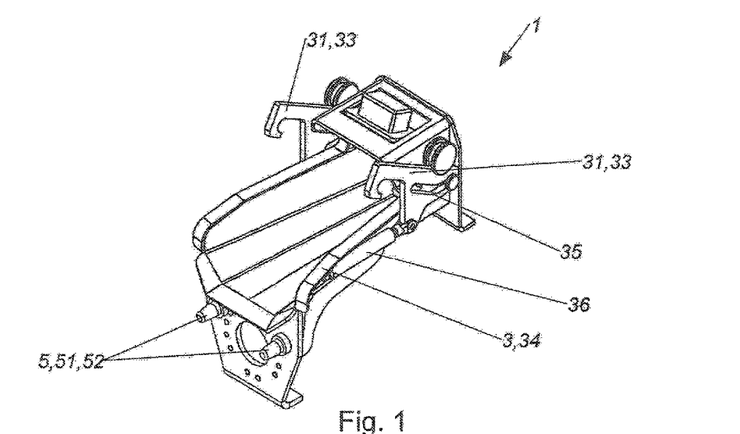
FIG. 1 shows a preferred embodiment of a coupling part in an axonometric view.
Figure 2:
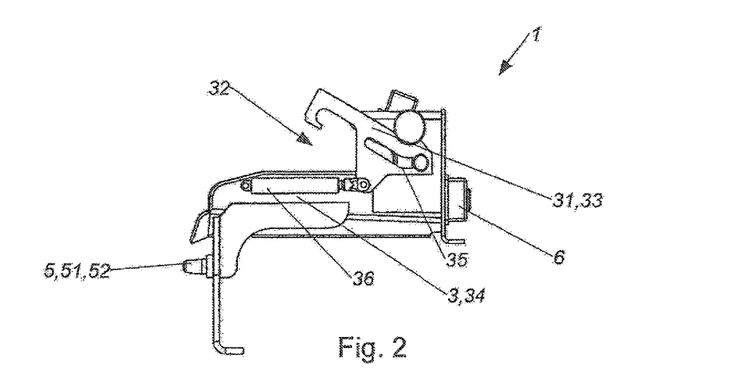
FIG. 2 shows the preferred embodiment of a coupling part in a side view.

As is shown in the preferred embodiment in FIGS. 1 and 2, it can be provided in an especially preferred manner that the positioning device 3 comprises a centering receiver 34, in which an insert body 41 of the counter-coupling part 4 can be introduced, and the centering receiver 34 constricts in the direction of a first end of the centering receiver 34. The movement of the insert body 41 in the direction of the constricting end of the centering receiver 34 leads in a simple way to a centering and a resulting positioning of the counter-coupling part 4 in relation to the coupling part 1 by a mutually aligned relative movement between the coupling part 1 and the counter-coupling part 4. The relative movement can be achieved by moving the vehicle 7 to the attachment module 8.

The insert body 41 of the attachment module 8 can especially be arranged in sections in a diametrically opposed manner in relation to the centering receiver 34. As a result, the insert body 41 can rest in the fixing position over a large area in the centering receiver 34, so that bending moments between the coupling part 1 and the counter coupling part 4 can be transmitted very well for example.

It can be provided in an especially preferred way that the positioning device 3 comprises a catching apparatus 31, and the catching apparatus 31 is formed to transfer a counter-coupling part 4 situated in a catching region 32 to the fixing position. It can especially be provided that in the positioning step the counter-coupling part 4 is drawn by the catching device 31 to the fixing position. The catching region 32 is the region in which the counter-coupling part 4 must be situated in order to be caught by the catching apparatus 31.

It can especially be provided that the catching apparatus 31 comprises at least one movable catching arm 33. The catching arm 33 can be pivotably mounted and comprise a hook-shaped end region, which end region engages in a catching receiver 44 of the counter-coupling part 4, and can thus draw the counter-coupling part 4 to the fixing position. In this case, the catching receivers 44 can especially be arranged as protrusions integrally attached to the insert body 41. In accordance with the preferred embodiment, two catching arms 33 can be provided which are arranged on both sides of the centering receiver 34.

It can be provided in an especially preferred way that the catching arm 33 is movably mounted in such a way that the catching arm 33 is moved at first in the direction of the centering receiver 34 during a draw-in motion and is subsequently moved in the direction of the first end of the centering receiver 34. This can especially be achieved by a link-cam system, as shown in FIGS. 1 and 2.

FIGS. 1 and 2 show the catching apparatus 31 in a receiving position, in which the counter-coupling part 4 can be introduced into the catching region. The catching region 32 comprises such positions of the counter-coupling part 4 in accordance with the preferred embodiment in which the catching receivers 44 are arranged between the catching arm in the receiving position and the centering receiver 34.

Figure 13:
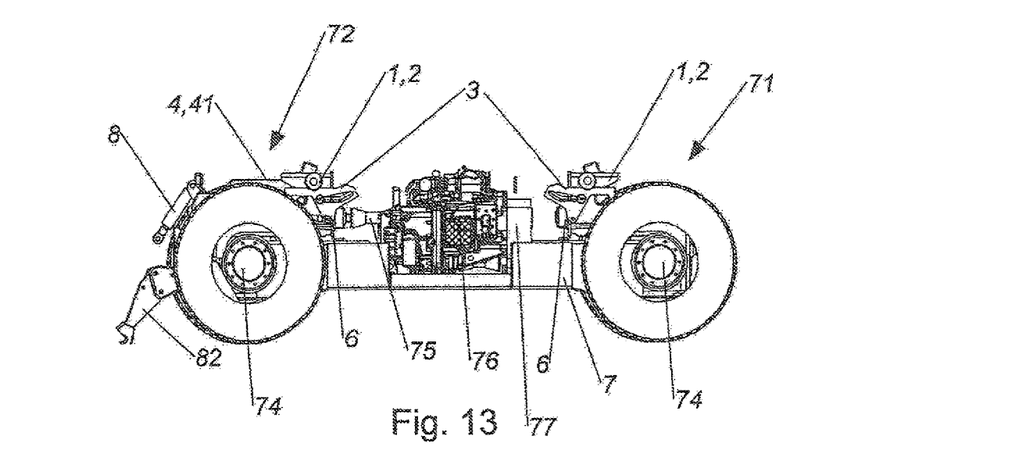
Figure 14:
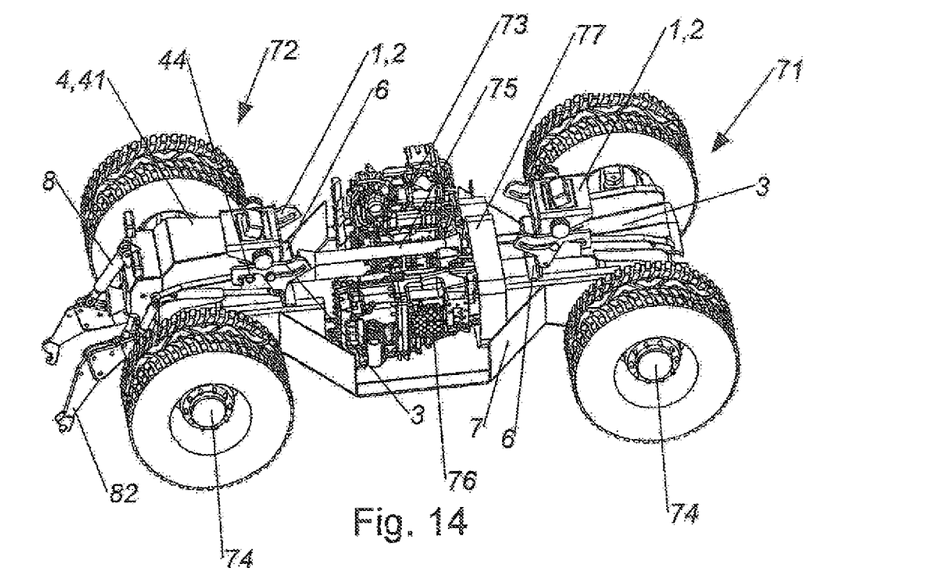
FIG. 14 shows the preferred embodiment of an attachment module and the preferred embodiment of a vehicle in the coupled state in an axonometric view.
Figure 15:
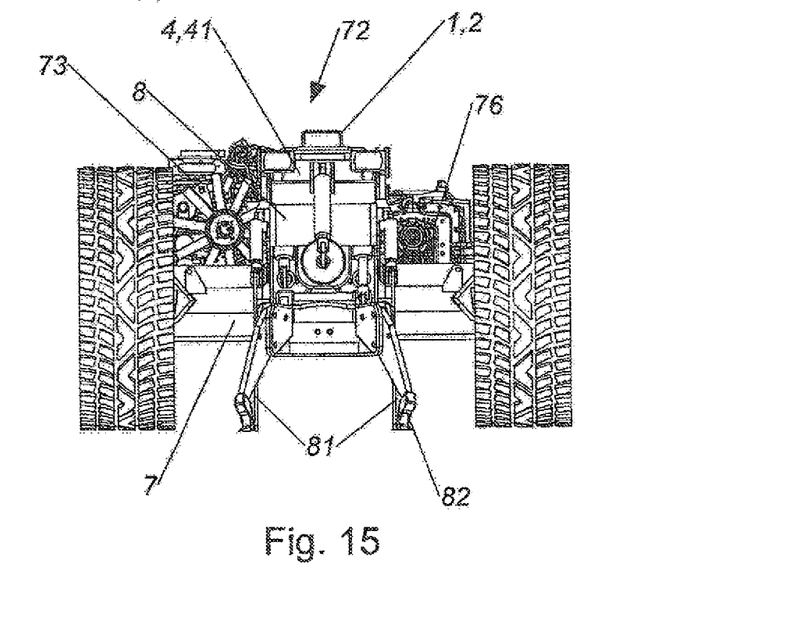
FIG. 15 shows the preferred embodiment of an attachment module and the preferred embodiment of a vehicle in the coupled state in a rear view.

FIGS. 13 and 14 show the catching apparatus 31 in a draw-in position in which the counter-coupling part 4 is arranged in the fixing position.

The force for the draw-in movement can occur via a hydraulic cylinder 36. As a result of this movement of the catching arm 33, a counter-coupling part 4 arranged in the catching region can be pressed at first, even in an oblique initial position, by the catching arm 33 to a position which is horizontal in relation to the coupling part 1 and can subsequently be drawn in the direction of the fixing position.

Figure 3:
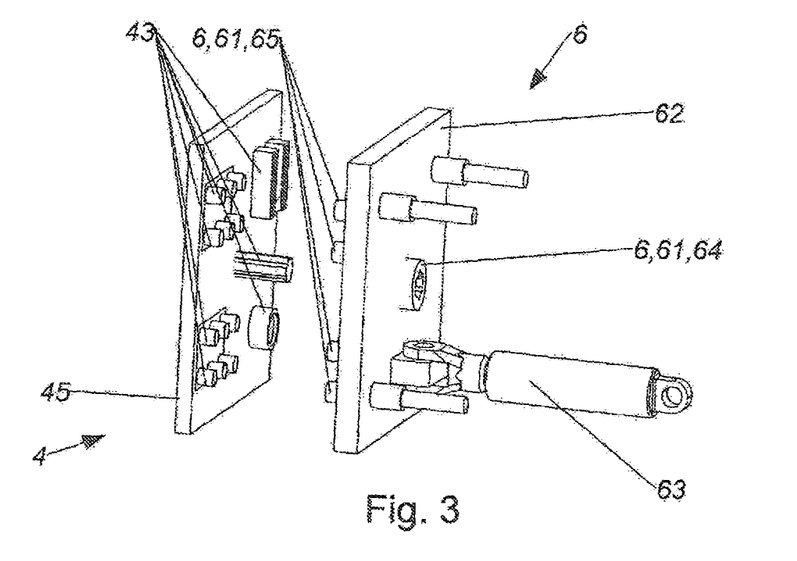
FIGS. 3 and 4 show a detail of a preferred embodiment of a vehicle coupling system in two different states.
Figure 4:
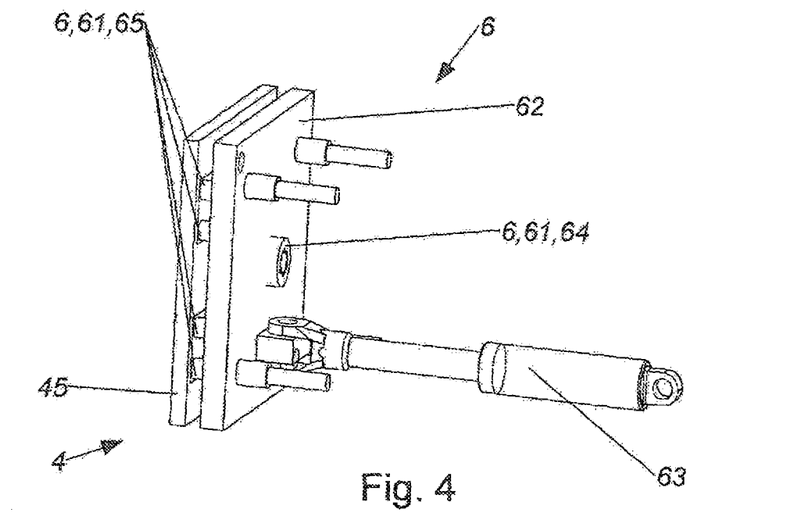

As is shown in FIGS. 3 and 4, it can be provided in an especially preferred manner that the contacting device 6 comprises a movably mounted docking plate 62, wherein the connections 61 are arranged on the docking plate 62, and the docking plate 62 is displaceable by means of a displacing unit 63 from a first position to a second position, wherein in the second position the connections 61 of the docking plate 62 can be operatively connected to a counter-coupling part 4 which is arranged in the fixing position. In this case, the displacing unit 63 can displace the docking plate 62 with the connections 61 in the direction of the counter-connections 43 in the contacting step and thus connect the connections 61 to the counter-connections 43. A large number of different connections 61 can be connected to the respective counter-connections 43 in a simple and reliable way.

It can especially be provided according to the illustrated preferred embodiment that the displacing unit 63 is formed as a hydraulic cylinder. It can alternatively be provided that the displacing unit 63 is formed as a spindle drive, linear drive or the like.

It can be provided in an especially preferred way that the contacting device 6 is arranged in the region of the first end of the centering receiver 34. An especially low level of play of the counter-coupling part 4 in relation to the coupling part can be achieved especially in the region of the constricting first end of the centering receiver 34, wherein an especially reliable connection of the connection 61 with the counter-connections 43 is possible in this region.

The contacting device 6 can especially comprise a plurality of differently formed connections 61.

It can further be provided that the counter-connections 43 are arranged on a counter-docking plate 45, which is arranged in a positionally secure manner in relation to the remaining counter-coupling part 4.

It can especially be provided that the connections 61 of the contacting device 6 comprise an electrical connection 65, a hydraulic connection and/or a compressed-air connection. The attachment module 8 can be operated electrically, hydraulically and/or pneumatically, wherein it can be provided with the required energy or the required operating means by the vehicle 7.

It can further especially be provided that the connections 61 of the contacting device 6 comprise a power take-off 64 and/or a drive shaft output. A power-takeoff 64 or a drive shaft output are connections of a PTO shaft or a drive shaft which can be coupled.

As a result of the connection formed by the power take-off 64, the attachment module 8 can carry out mechanical activities, wherein the required movement energy is generated in the vehicle 7 and is transferred by the power take-off to the attachment module 8.

As a result of the connection formed by the drive shaft output, the attachment module 8 can be arranged as an axle module which represents an additionally driven axle for the vehicle 7, by means of which a biaxial vehicle 7 can be converted rapidly into a triaxial vehicle 7.

It can further be provided that the attachment module 8 comprises the counter-coupling part 4 on one side on which it can be coupled to the vehicle, and comprises a further coupling part 1 on the opposite side on which a further attachment module 8 can be coupled. As a result, a modular design of the vehicle 7 can be achieved which can be used in an especially flexible way with a large number of attachment modules 8. This can be especially advantageous when the attachment module 8 is arranged as an axle module.

It can especially be provided that the contacting device comprises between 10 and 50 connections.

It can be provided according to an advantageous further development that the connections 61 comprise contacts for control signals. Said contacts for control signals can be formed as a bus system for example. Such control signals can directly trigger valves in the attachment module 8 for example. It can further be provided that the attachment module 8 comprises a control unit, which control unit is controlled by the control signals. It is advantageous that merely an on or off control is often only possible in conventional attachment devices as a result of the interface of the coupling system. A controlled and continuous triggering is possible in this case as a result of the triggering of the control unit. Furthermore, the number of connections 61 can be kept at a low level, since merely the contacts for the control signals and a supply with power or operating medium are sufficient.

Figures 5, 6, 7:
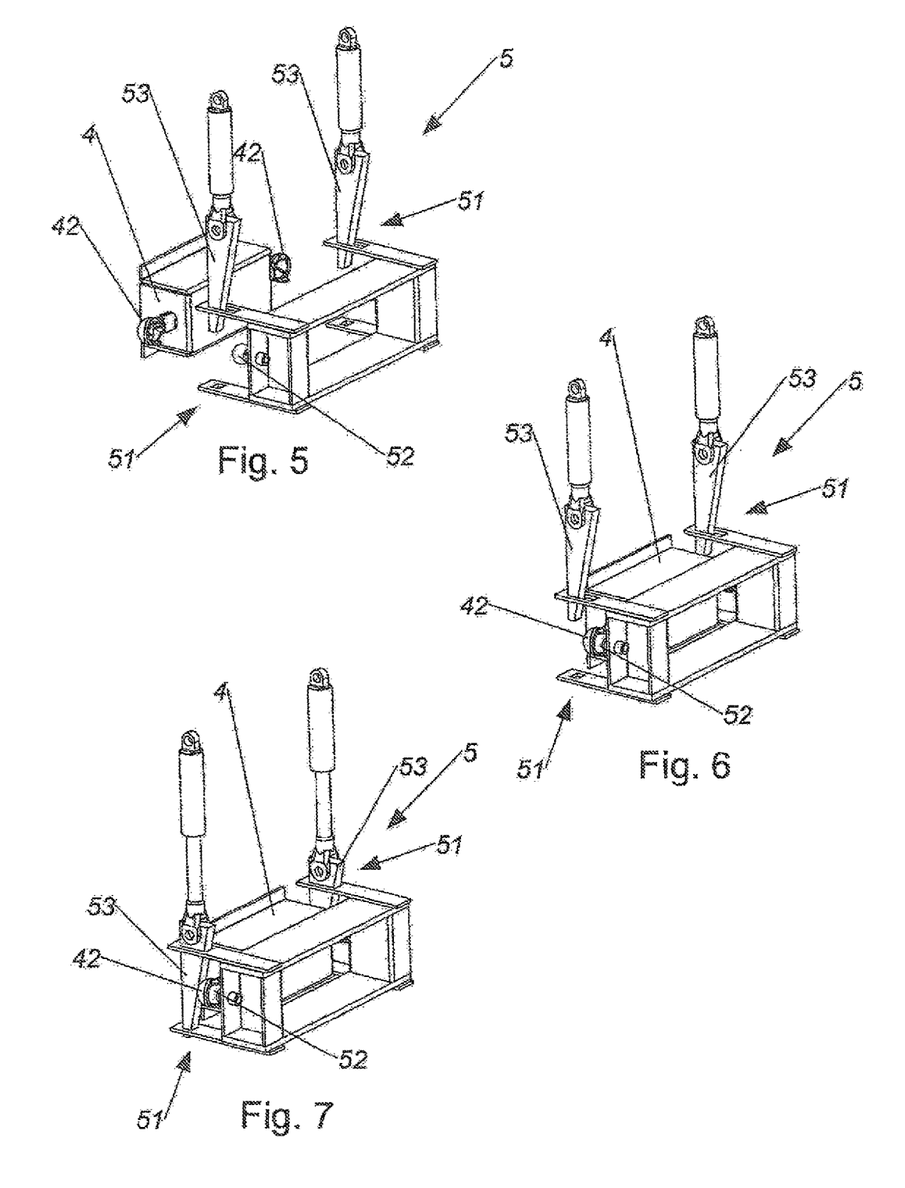
FIGS. 5 to 7 show a further detail of the preferred embodiment of a vehicle coupling system in three different states.
Figures 8, 9:
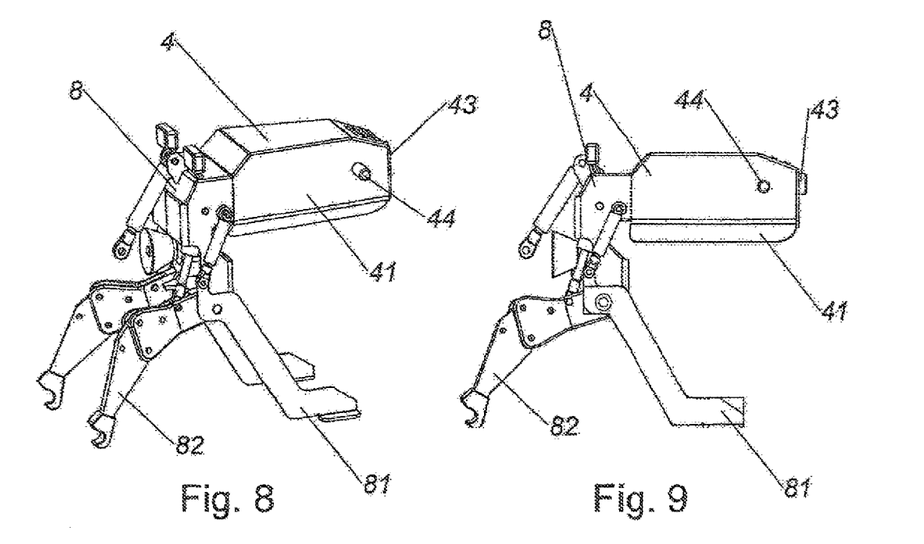
FIG. 8 shows a preferred embodiment of an attachment module in an axonometric view.
FIG. 9 shows the preferred embodiment of an attachment module in a side view.
Figure 10:
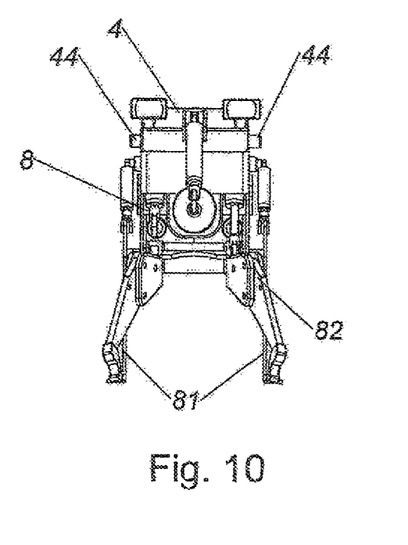
FIG. 10 shows the preferred embodiment of an attachment module in a rear view.
Figure 11:
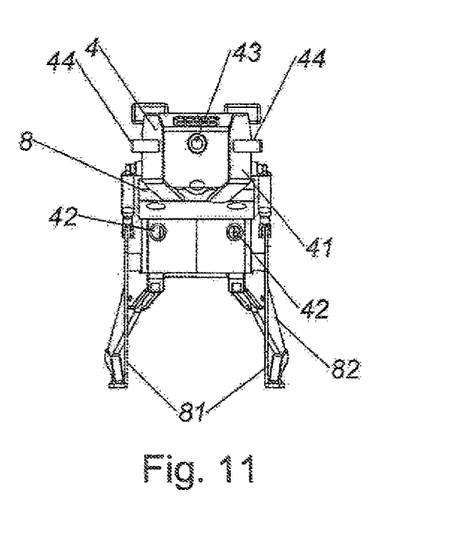
FIG. 11 shows the preferred embodiment of an attachment module in a front view.
Figure 12:
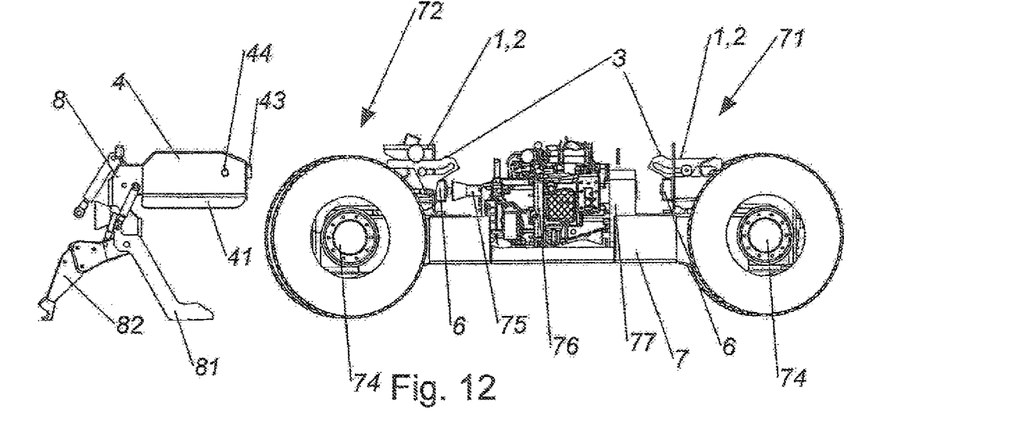
FIGS. 12 and 13 show the preferred embodiment of an attachment module and a preferred embodiment of a vehicle in two different states.

As is shown in FIGS. 5 to 7, it can be provided that the fixing device 5 comprises at least one fixing element 51 with a contact element 52, and the at least one fixing element 51 comprises a displaceable, especially wedge-shaped, fixing pin 53, which fixing pin 53 engages behind a counter-contact element 42 of a counter-coupling part 4 which rests on the contact element 52 in the fixing position and can fix the same to the contact element 52. The fixing device 5 is only shown incompletely in FIGS. 1 and 2. Two fixing elements 51 are shown in different states of the fixing step in FIGS. 5 to 7. In this case, an especially reliable and play-free fixing of the counter-coupling part 4 to the coupling part 1 can be achieved.

FIG. 5 shows the fixing device 5 and parts of the counter-coupling part 4 during the positioning step. The fixing device 5 is in the release position in this case.

FIG. 6 shows the fixing device 5 in the release position, wherein the counter-coupling part 4 is in the fixing position. The contact elements 52 and the counter-contact elements 42 come into contact here.

In the state shown in FIG. 7, the fixing pins 53 were moved to the fixing position, as a result of which the contact elements 52 and the counter-contact elements 42 are held in contact, and a fixed connection is produced between the coupling part 1 and the counter-coupling part 4.

The fixing device 5 can especially be formed as a three-point or four-point fixing, thus producing a reliable rigid fixing.

FIGS. 12 to 15 show a preferred embodiment of a vehicle 7, wherein the chassis with the driver's cab is not shown.

In this case, the vehicle 7 can especially comprise at least two axles 74, wherein it is arranged in the preferred embodiment as a biaxial vehicle with two axles 74. Both axles 74 can be driven and steered in particular.

It can be provided in an especially preferred way that the vehicle 7 comprises a mid-engine 73 and a gearbox 76 arranged adjacent to the mid-engine 73, the mid-engine 73 and the gearbox 76 are operatively connected by means of a gear connection 77, and the mid-engine 73, the gearbox 76 and the gear connection 77 are arranged in a U-shaped manner with respect to each other. The gear connection 77 can be formed as a belt drive or chain drive for example, or as a chain of gearwheels which transfer the torque from the mid-engine 73 to the gearbox 76. The gear connection 77 and the gearbox 76 can form a gear unit. An especially compact configuration can be achieved by the advantageous arrangement of the mid-engine 73 and the gearbox 76 in the middle of the vehicle, wherein the length of the mid-engine 73 together with the gearbox 76 is short as a result of the U-shaped arrangement in comparison with the overall length of the vehicle 7. This compact configuration ensures that the vehicle can reach a total length of the vehicle 7, even in the case of the arrangement of coupling parts 1 in the front region 1 and in the rear region 72, which does not go beyond the total length of a conventional comparable vehicle.

The vehicle 7 can further especially comprise a centrally arranged PTO shaft 75 and/or a drive shaft which is operatively connected to the contacting device 6, wherein the torque of the PTO shaft 75 and/or the drive shaft can be transferred by the contacting device 6 to the attachment module 8.

The PTO shaft 75 and/or the drive shaft can especially be operatively connected to the gear connection 77, wherein the gear connection 77 operatively connects the gearbox 76 to the PTO shaft 75 and/or the drive shaft.

It can further be provided that the chassis of the vehicle 7 is height-adjustable in a predeterminable manner, especially in a hydraulic way, by means of which the coupling part 1 can be brought to a height suitable for the attachment module 8 during the displacement for coupling.

It can be provided in an especially preferred manner that the vehicle 7 comprises a front region 71 and a rear region 72, and a coupling part 1 is respectively arranged on the front region 71 and the rear region 72. The two coupling parts 1 can especially formed in an identical manner with respect to each other. As a result, the vehicle 7 can be used for an especially large number of activities and tasks.

It can further be provided that the coupling part is arranged above the axle 74 in the operating position. Tilting of the vehicle can thus be prevented even in the case of heavy attachment modules 8 and especially good drivability can be achieved.

The attachment module 8 can be formed in numerous ways. For example, the attachment module 8 can be formed as a tool such as a snowplough, a rotary snowplough, a road sweeping apparatus, a reaping machine and the like, which can be coupled rigidly to the vehicle 7.

It can be provided in an especially preferred manner that the attachment module 8 comprises a retractable erecting apparatus 81. As a result of the retractable erecting apparatus 81, the attachment module 8 can be maintained automatically in a position in which the vehicle 7 merely needs to move forward for coupling in order to transfer the counter-coupling part 4 to the catching region 32. In the coupled state, the erecting apparatus 81 can be retracted so that it does not obstruct further operation. The retractable erecting apparatus 81 can be formed as a pivotable supporting leg or telescopic leg.

The attachment module 8 can further be formed as an adapter for conventional trailer hitching systems.

It can be provided according to the preferred embodiment of an attachment module according to FIGS. 8 to 15 that that the attachment module 8 comprises a three-point power lift with lower links 82, which power lift especially comprises a further PTO shaft. In this case, the retractable erecting apparatus 81 can especially be formed as two pivotable supporting legs, wherein the attachment module 8 can be erected on the lower links and the supporting legs.

What is claimed is:

1. A coupling part of a vehicle coupling system, comprising:
    a positioning device comprising a centering receiver and a catching apparatus,
    said centering receiver narrowing in a direction of a first end of the centering receiver and being constructed for receiving an insert body of a counter-coupling part, thereby centering the counter-coupling body,
    said catching apparatus having at least one catching arm, said catching arm being movably mounted so that during a draw-in movement the catching arm is first moved in a direction of the centering receiver and is subsequently moved in a direction of the first end of the centering receiver,
    said catching arm during the draw-in movement engaging the counter coupling part received in the centering receiver in a catching region and transferring the counter coupling part into a fixing position;
    a fixing device movable between a release location and a fixing location, said fixing device, fixing the counter-coupling part to the coupling part in the fixing position in a positionally secure manner; and
    a contacting device having connections and being arranged in a region of the first end of the centering receiver.

2. The coupling part of claim 1, wherein said connections are movable in a direction of the counter-coupling part arranged in the fixing position when the fixing device is in the fixing location.

3. The coupling part of claim 2, further comprising a displacing unit, said contacting device comprising a movably mounted docking plate, said connections being arranged on the docking plate, said docking plate being displaceable by the displacing unit from a first position to a second position, wherein in the second position the connections of the docking plate are operatively connectable to the counter-coupling part arranged in the fixing position.

4. The coupling part of claim 2, wherein the connections of the contacting device comprise at least one of a PTO shaft output and a drive shaft output.

5. The coupling part of claim 2, wherein the connections of the contacting device comprise at least one of an electrical connection, a hydraulic connection and a compressed-air connection.

6. The coupling part of claim 1, wherein the fixing device comprises at least one fixing element, said at least one fixing element comprising a contact element and a displaceable fixing pin, said fixing pin being adapted to engage behind a counter-contact element of the counter-coupling part resting on the contact element when the counter-coupling part is in the fixing position, and to fix the counter contact element on the counter-coupling part.

7. The coupling part of claim 6, wherein the fixing pin is configured wedge-shaped.

8. A vehicle coupling system, comprising:
   a coupling part and a counter coupling part, said coupling part comprising
   a positioning device comprising a centering receiver and a catching apparatus,
   said centering receiver narrowing in a direction of a first end of the centering receiver and being constructed for receiving an insert body of the counter-coupling part, thereby centering the counter-coupling body,
   said catching apparatus having at least one catching arm, said catching arm being movably mounted so that during a draw-in movement the catching arm is first moved in a direction of the centering receiver and is subsequently moved in a direction of the first end of the centering receiver,
   said catching arm during the draw-in movement engaging the counter coupling part received in the centering receiver in a catching region and transferring the counter coupling part into a fixing position;
   a fixing device movable between a release location and a fixing location, said fixing device, fixing the counter-coupling part to the coupling part in the fixing position in a positionally secure manner; and
   a contacting device having connections and being arranged in a region of the first end of the centering receiver.

9. The vehicle coupling system of claim 8, wherein the connections are movable in a direction of the counter-coupling part arranged in the fixing position when the fixing device is in the fixing location and the counter-coupling part comprises counter-connections, said contacting device being operatively connectable the connections of the coupling part and the counter-connections of the counter-coupling part situated in the fixing position.

10. A vehicle, comprising:
   at least one coupling part, said at lest one coupling part comprising
      a positioning device comprising a centering receiver and a catching apparatus,
      said centering receiver narrowing in a direction of a first end of the centering receiver and being constructed for receiving an insert body of a counter-coupling part, thereby centering the counter-coupling body,
      said catching apparatus having at least one catching arm, said catching arm being movably mounted so that during a draw-in movement the catching arm is first moved in a direction of the centering receiver and is subsequently moved in a direction of the first end of the centering receiver,
      said catching arm during the draw-in movement engaging the counter coupling part received in the centering receiver in a catching region and transferring the counter coupling part into a fixing position;
      a fixing device movable between a release location and a fixing location, said fixing device, fixing the counter-coupling part to the coupling part in the fixing position in a positionally secure manner; and
      a contacting device having connections and being arranged in a region of the first end of the centering receiver.

11. The vehicle of claim 10, comprising two said at least one coupling part, with one of the two coupling parts being arranged in a rear region of the vehicle and the other one of the two coupling parts being arranged in a front region of the vehicle.

12. A method for coupling a vehicle coupling system, comprising:
   in a positioning step receiving a counter-coupling part in a centering receiver and guiding the counter-coupling part with a movable catching arm of a catching apparatus into a fixing position for fixing to a coupling part, wherein the counter-coupling part is centered during the positioning step by the centering receiver;
   in a fixing step fixing the counter-coupling part in a positionally secure manner to the coupling part by a fixing device of the coupling part;
   in a contacting step subsequent to the fixing step operatively connecting connections of the coupling part and counter-connections of the counter-coupling part by a contacting device of the coupling part, said coupling part comprising,
   a positioning device comprising the centering receiver and a catching apparatus,
   said centering receiver narrowing in a direction of a first end of the centering receiver and being constructed for receiving an insert body of the counter-coupling part, thereby centering the counter-coupling body,
   said catching apparatus having the at least one catching arm, said catching arm being movably mounted so that during a draw-in movement the catching arm is first moved in a direction of the centering receiver and is subsequently moved in a direction of the first end of the centering receiver,
   said catching arm during the draw-in movement engaging the counter coupling part received in the centering receiver in a catching region and transferring the counter coupling part into a fixing position;
   a fixing device movable between a release location and a fixing location, said fixing device, fixing the counter-coupling part to the coupling part in the fixing position in a positionally secure manner; and
   a contacting device having connections and being arranged in a region of the first end of the centering receiver.

* * * * *